2 Sheets. Sheet 1.

H. Tucker,

Bed Bottom.

No. 1,217. Reissued Aug. 6, 1861.

Witnesses:

D. B. Crully

M. H. Bacon.

Inventor:

Hiram Tucker

N. PETERS, PHOTO-LITHOGRAPHER, WASHINGTON, D. C.

2 Sheets-Sheet 2.

H. Tucker,

Bed Bottom.

No. 1,217. Reissued Aug. 6, 1861.

Witnesses:

Albert Parker

C. Ernest Cadwa.

Inventor:

Hiram Tucker

N. PETERS. PHOTO-LITHOGRAPHER, WASHINGTON, D. C.

UNITED STATES PATENT OFFICE.

HIRAM TUCKER, OF NEWTON, MASSACHUSETTS.

IMPROVEMENT IN SPRING BED-BOTTOMS.

Specification forming part of Letters Patent No. 13,188, dated July 3, 1855; Reissue No. 633, dated April 5, 1859
Reissue No. 1,217, dated August 6, 1861.

*To all whom it may concern:*

Be it known that I, HIRAM TUCKER, of Newton, in the county of Middlesex and State of Massachusetts, but formerly of Cambridgeport, in said county and State, have invented a new and Improved Spring Bed-Bottom, of which the following is a full, clear, and exact description, reference being had to the accompanying drawings, which form a part of this specification.

Figure 1:
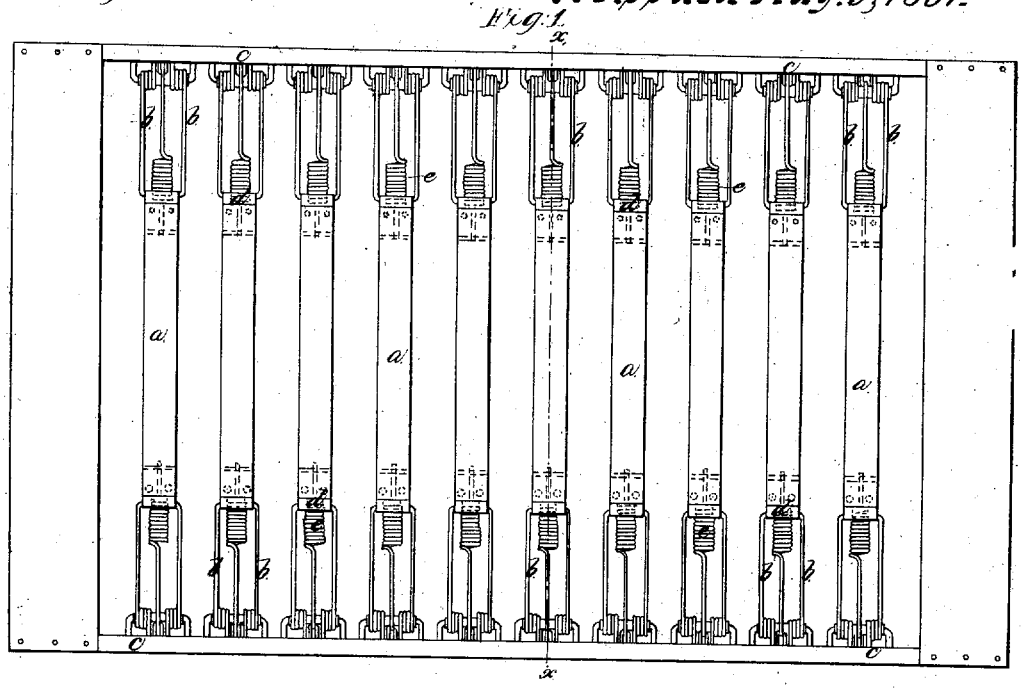
Figure 2:
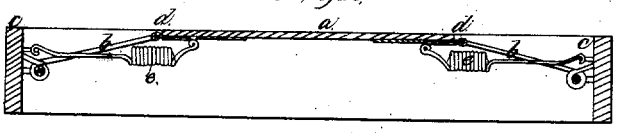
Figure 3:
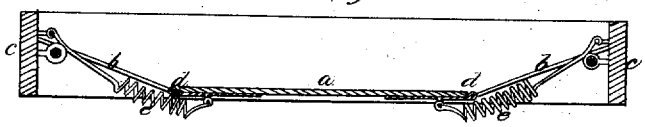
Figure 1:
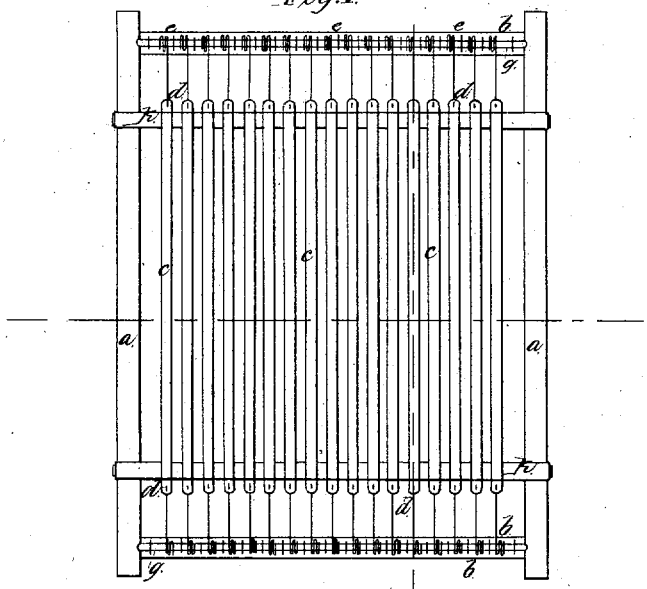
Figure 2:
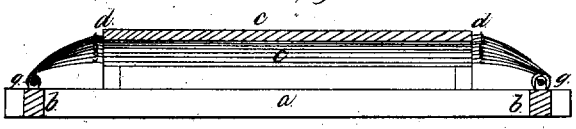
Figure 3:
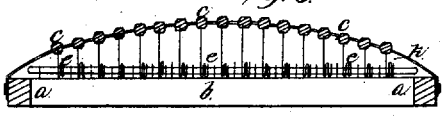

Figure 1 of Sheet 1 is a plan illustrating my original invention; Fig. 2, a cross-section taken in the line *x x*, (seen in Fig. 1,) showing one of the slats and other parts connected therewith in their normal position; and Fig. 3, a cross-section taken in the same plane with Fig. 2, but showing the parts in the position they tend to assume when in use, subject to weight. Fig. 1 of Sheet 2 is a plan illustrating my improved invention. Fig. 2 is a vertical longitudinal section taken in the line *y y*, (seen in Fig. 1;) and Fig. 3 is a vertical transverse section taken in the line *z z*, (also seen in Fig. 1.)

My invention consists in a novel construction of an elastic foundation for bedding upon bedsteads. I construct my bed-bottom of a series of wooden slats, held in position by radial-acting springs attached to a foundation-frame, and, when arranged longitudinally, connected by check-bands, substantially as shown in the drawings.

In Sheet 1 of the drawings, *a* represents the slats, broad, and arranged transversely within the foundation-frame. *b* represents the radial springs—double in Sheet 1 and single in Sheet 2. These springs are suitably attached at one end to the foundation-frame *c* or to the bedstead-rails serving for such frame, and are united at the other end with the slats by flexible loops *d* that are noiseless in action. These springs may be made of various forms and may be variously connected with the slats and frame, as shown in the drawings; but while they retain their peculiar action—viz., lifting and holding the slats straight and free in their movements—they are but modifications of the same spring. Thus the upper springs shown in the drawings on Sheet 1 and the springs shown in the drawings on Sheet 2 are the same in form and action, except that each of the first-mentioned springs is like the result of uniting two of those last mentioned. Both may be considered as radial levers with their ends formed into helices. By so constructing the springs a great extent of movement of their radial part is permitted without impairing the elasticity of their coiled part. It is obvious, however, that when the helices of the springs are dispensed with, their radial character remains, and that they may be made efficient in all respects, if sufficient length is given them. The lower springs, *e*, (shown on Sheet 1,) having their coiled part in the middle, act by the extension of their helices instead of by the torsion of them, and tend to steady the slats when short and arranged transversely within the foundation-frame. When the bars or slats are arranged longitudinally within the frame, as shown in Sheet 2, I connect them by flexible check-straps *f*, which serve to limit the independent movement of each slat, and also to protect the springs from injury from excessive movement or side strains. This construction last described, embracing my additional improvement, I deem the best. The comparatively rigid slats and the flexible radial springs united and acting together within a suitable foundation-frame, substantially as shown in Sheet 2 of the drawings, compose a bed-bottom sufficiently elastic for comfort and free from objectionable sagging, thus affording an easy and agreeable support to the incumbent body in any position.

I claim—

A spring bed-bottom, constructed and operating substantially as herein described.

HIRAM TUCKER.

Witnesses:
J. B. CROSBY,
WM. H. CADES.